US010218783B2

(12) United States Patent
Gong et al.

(10) Patent No.: US 10,218,783 B2
(45) Date of Patent: Feb. 26, 2019

(54) MEDIA SHARING TECHNIQUES

(71) Applicant: Intel Corporation, Santa Clara, CA (US)

(72) Inventors: Michelle X. Gong, Sunnyvale, CA (US); Horst W. Haussecker, Palo Alto, CA (US); Ali Mehdizadeh, Belmont, CA (US); Tam Le, Foster City, CA (US); Krishna Kaza, Santa Clara, CA (US)

(73) Assignee: INTEL CORPORATION, Santa Clara, CA (US)

( * ) Notice: Subject to any disclaimer, the term of this patent is extended or adjusted under 35 U.S.C. 154(b) by 0 days.

(21) Appl. No.: 13/997,231

(22) PCT Filed: May 13, 2013

(86) PCT No.: PCT/US2013/040738
§ 371 (c)(1),
(2) Date: Jun. 22, 2013

(87) PCT Pub. No.: WO2014/185888
PCT Pub. Date: Nov. 20, 2014

(65) Prior Publication Data
US 2015/0081783 A1 Mar. 19, 2015

(51) Int. Cl.
G06F 15/16 (2006.01)
H04L 29/08 (2006.01)
(Continued)

(52) U.S. Cl.
CPC ........... H04L 67/104 (2013.01); G06Q 10/10 (2013.01); G06Q 30/0204 (2013.01);
(Continued)

(58) Field of Classification Search
CPC ......... H04L 51/06; H04L 51/08; H04L 51/10; H04L 51/20; H04L 51/24; H04L 51/22; H04L 51/32; H04L 51/36; H04L 29/06176
See application file for complete search history.

(56) References Cited

U.S. PATENT DOCUMENTS 8,364,559 B1* 1/2013 Bhosle ................... G06Q 30/00
705/26.63
8,472,722 B2* 6/2013 Nayar .................... G06T 11/60
382/190

(Continued)

OTHER PUBLICATIONS

International Search Report and Written Opinion received for PCT Patent Application No. PCT/US2013/040738, dated Jul. 1, 2013, 8 pages.

(Continued)

Primary Examiner — Dhairya A Patel

(57) ABSTRACT

Improved techniques for media item sharing are described. In one embodiment, for example, an apparatus may comprise a classification module to assign a media item to a content category, a correlation module to determine context information for the media item, and an estimation module to determine a set of relevance values for a set of contacts based at least in part on a sharing history and to generate a set of suggested recipients for the media item based at least in part on the set of relevance values and the set of contacts. Other embodiments are described and claimed.

25 Claims, 8 Drawing Sheets

(51) Int. Cl.
  *G06Q 10/10* (2012.01)
  *G06Q 30/02* (2012.01)
  *H04L 29/06* (2006.01)

(52) U.S. Cl.
  CPC ...... *H04L 65/1089* (2013.01); *H04L 65/4038* (2013.01); *H04L 65/60* (2013.01); *H04L 67/22* (2013.01)

(56) References Cited

U.S. PATENT DOCUMENTS

| | | | |
|---|---|---|---|
| 8,712,189 B2* | 4/2014 | Bitouk | G06T 11/60 |
| | | | 382/294 |
| 2002/0120505 A1* | 8/2002 | Henkin | G06Q 30/02 |
| | | | 705/14.69 |
| 2003/0046281 A1* | 3/2003 | Son | G06F 17/30876 |
| 2011/0106911 A1 | 5/2011 | Sung et al. | |
| 2011/0136542 A1* | 6/2011 | Sathish | H04M 1/72569 |
| | | | 455/566 |
| 2011/0225152 A1* | 9/2011 | Beaudreau | G06F 17/30867 |
| | | | 707/728 |
| 2011/0320551 A1 | 12/2011 | Koren | |
| 2012/0020471 A1* | 1/2012 | Erhart | H04M 3/5232 |
| | | | 379/265.1 |
| 2012/0086792 A1* | 4/2012 | Akbarzadeh | H04N 1/00307 |
| | | | 348/77 |
| 2012/0252352 A1 | 10/2012 | Rao | |
| 2012/0260188 A1* | 10/2012 | Park | G06Q 10/107 |
| | | | 715/739 |
| 2013/0031196 A1 | 1/2013 | Yan | |
| 2013/0204664 A1* | 8/2013 | Romagnolo | G06Q 30/0203 |
| | | | 705/7.32 |
| 2013/0332846 A1* | 12/2013 | Freedman | H01B 7/292 |
| | | | 715/745 |
| 2014/0171039 A1* | 6/2014 | Bjontegard | H04W 4/029 |
| | | | 455/414.1 |
| 2014/0189572 A1* | 7/2014 | Martens | G06F 3/04817 |
| | | | 715/780 |
| 2014/0372905 A1* | 12/2014 | Bryant | G06Q 10/10 |
| | | | 715/753 |

OTHER PUBLICATIONS

Extended European Search Report received for European patent Application No. 13884600.1, dated Oct. 21, 2016, 7 pages.

* cited by examiner

*FIG. 5*

Storage Medium 500

Computer Executable Instructions for 400

MEDIA SHARING TECHNIQUES

Embodiments described herein generally relate to techniques for sharing video and/or audio media items, and to techniques for identifying potential sharing recipients for such media items.

Users of devices capable of multiple electronic communication techniques are often presented with myriad options for sharing media items captured and/or received using such devices. For example, when a user captures a photograph using a smartphone, the user may have the option of sharing that photograph via email, text message, social networking application post, and/or via other communication techniques. Additionally, there may be distinct, extensive contact lists associated with each such communication technique. As a result, for a typical user, the selection of sharing recipients for any particular media item may potentially be laborious and time-consuming.

FIG. 5 illustrates one embodiment of a storage medium.

Various embodiments may be generally directed to improved techniques for media item sharing. In one embodiment, for example, an apparatus may comprise a classification module to assign a media item to a content category, a correlation module to determine context information for the media item, and an estimation module to determine a set of relevance values for a set of contacts based at least in part on a sharing history and to generate a set of suggested recipients for the media item based at least in part on the set of relevance values and the set of contacts. Other embodiments may be described and claimed.

Various embodiments may comprise one or more elements. An element may comprise any structure arranged to perform certain operations. Each element may be implemented as hardware, software, or any combination thereof, as desired for a given set of design parameters or performance constraints. Although an embodiment may be described with a limited number of elements in a certain topology by way of example, the embodiment may include more or less elements in alternate topologies as desired for a given implementation. It is worthy to note that any reference to "one embodiment" or "an embodiment" means that a particular feature, structure, or characteristic described in connection with the embodiment is included in at least one embodiment. The appearances of the phrases "in one embodiment," "in some embodiments," and "in various embodiments" in various places in the specification are not necessarily all referring to the same embodiment.

Figure 1:
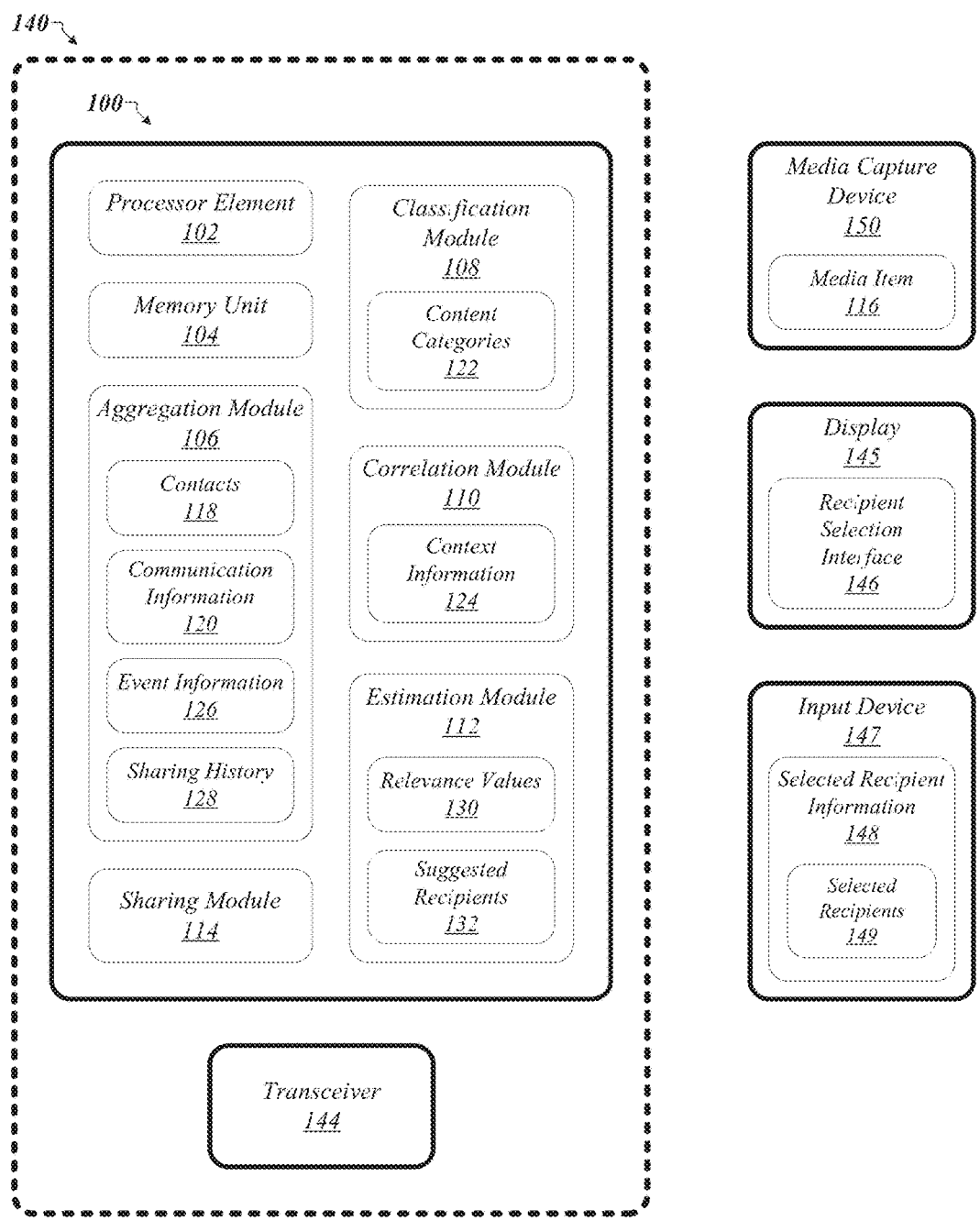
FIG. 1 illustrates one embodiment of an apparatus and one embodiment of a first system.

FIG. 1 illustrates a block diagram of an apparatus 100. As shown in FIG. 1, apparatus 100 comprises multiple elements including a processor element 102, a memory unit 104, a classification module 108, a correlation module 110, and an estimation module 112. The embodiments, however, are not limited to the type, number, or arrangement of elements shown in this figure.

In various embodiments, apparatus 100 may comprise processor element 102. Processor element 102 may be implemented using any processor or logic device, such as a complex instruction set computer (CISC) microprocessor, a reduced instruction set computing (RISC) microprocessor, a very long instruction word (VLIW) microprocessor, an x86 instruction set compatible processor, a processor implementing a combination of instruction sets, a multi-core processor such as a dual-core processor or dual-core mobile processor, or any other microprocessor or central processing unit (CPU). Processor element 102 may also be implemented as a dedicated processor, such as a controller, a microcontroller, an embedded processor, a chip multiprocessor (CMP), a co-processor, a digital signal processor (DSP), a network processor, a media processor, an input/output (I/O) processor, a media access control (MAC) processor, a radio baseband processor, an application specific integrated circuit (ASIC), a field programmable gate array (FPGA), a programmable logic device (PLD), and so forth. The embodiments are not limited in this context.

In some embodiments, apparatus 100 may comprise or be arranged to communicatively couple with a memory unit 104. Memory unit 104 may be implemented using any machine-readable or computer-readable media capable of storing data, including both volatile and non-volatile memory. For example, memory unit 104 may include read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, or any other type of media suitable for storing information. It is worthy of note that some portion or all of memory unit 104 may be included on the same integrated circuit as processor element 102, or alternatively some portion or all of memory unit 104 may be disposed on an integrated circuit or other medium, for example a hard disk drive, that is external to the integrated circuit of processor element 102. Although memory unit 104 is comprised within apparatus 100 in FIG. 1, memory unit 104 may be external to apparatus 100 in some embodiments. The embodiments are not limited in this context.

In various embodiments, apparatus 100 may comprise aggregation module 106. In some embodiments, aggregation module 106 may comprise logic, circuitry, and/or instructions operative to identify, accumulate, and/or manage one or more contacts 118 for consideration as potential sharing recipients for media items 116 such as pictures, images, videos, sounds, songs, audio and/or video recordings, and/or other types of media items 116. In various embodiments, aggregation module 106 may additionally or alternatively be operative to identify, accumulate, and/or manage communication information 120 describing communications previously performed by one or more persons, groups, accounts, addresses, telephone numbers, and/or other entities associated with apparatus 100 and/or system 140. The embodiments are not limited in this context.

In some embodiments, apparatus 100 may comprise classification module 108. In various embodiments, classification module 108 may comprise logic, circuitry, and/or instructions operative to classify media items 116 into one or more content categories 122. In some embodiments, classification module 108 may be operative to classify one or more media items 116 into one or more content categories 122 by analyzing the contents of those media items 116. For example, in various embodiments, classification module 108 may be operative to analyze and classify each of one or more media items 116 into either a "mainly people" category or a "mainly scenery" category based on the contents of the one or more media items 116. The embodiments are not limited to this example.

In some embodiments, apparatus 100 may comprise correlation module 110. In various embodiments, correlation module 110 may comprise logic, circuitry, and/or instructions operative to determine correlations between one or more media items 116 and one or more contacts 118. In some embodiments, correlation module 110 may be operative to determine context information 124 for one or more media items 116, and to determine correlations between the one or more media items 116 and one or more contacts 118 based on the context information 124. In various embodiments, correlation module 110 may be operative to determine correlations between one or more media items 116 and one or more contacts 118 based additionally or alternatively on one or more content categories 122 into which the one or more media items 116 have been classified by classification module 108. The embodiments are not limited in this context.

In some embodiments, apparatus 100 may comprise estimation module 112. In various embodiments, estimation module 112 may comprise logic, circuitry, and/or instructions operative to determine one or more relevance values 130. In some embodiments, each relevance value 130 may comprise an estimate of the level of relevance of a particular media item 116 to a particular contact 118, and/or an estimate of a likelihood that sharing the media item 116 with that contact 118 may be desirable. A given media item 116 may be expected to be of greater relevance to a given contact 118 if, for example, that contact 118 appears in the media item 116, if family or friends of the contact 118 appear in the media item 116, if media items 116 have been frequently shared with the contact 118 in the past, or if the media item 116 depicts an event that the contact 118 attended. In various embodiments, for any particular media item 116, estimation module 112 may be operative to determine a set of relevance values 130 for a set of contacts 118 specified by correlation module 110. In some embodiments, each relevance value 130 in the set of relevance values 130 may correspond to a respective one of the contacts 118 in the set of contacts 118. It is worthy of note that as employed herein, the term "set" denotes a group of one or more.

In various embodiments, apparatus 100 may comprise sharing module 114. In some embodiments, sharing module 114 may comprise logic, circuitry, and/or instructions operative to share one or more media items 116 with one or more sharing recipients by communicating via one or more communications methods. In various embodiments, sharing module 114 may be operative to share one or more media items 116 with one or more sharing recipients selected from among contacts 118 identified, accumulated, and/or managed by aggregation module 106. In some embodiments, communications methods utilized by sharing module 114 in order to share media items 116 may include, for example, email, text messaging, instant messaging, and social network posts and messages. The embodiments are not limited to these examples.

FIG. 1 also illustrates a block diagram of a system 140. System 140 may comprise any of the aforementioned elements of apparatus 100. System 140 may further comprise a transceiver 144. Transceiver 144 may include one or more radios capable of transmitting and receiving signals using various suitable wireless communications techniques. Such techniques may involve communications across one or more wireless networks. Exemplary wireless networks include (but are not limited to) wireless local area networks (WLANs), wireless personal area networks (WPANs), wireless metropolitan area network (WMANs), cellular networks, and satellite networks. In communicating across such networks, transceiver 144 may operate in accordance with one or more applicable standards in any version. The embodiments are not limited in this context.

In various embodiments, apparatus 100 and/or system 140 may comprise and/or be communicatively coupled to a display 145. Display 145 may comprise any display device capable of displaying information received from processor element 102. Examples for display 145 may include a television, a monitor, a projector, and a computer screen. In one embodiment, for example, display 145 may be implemented by a liquid crystal display (LCD), light emitting diode (LED) or other type of suitable visual interface. Display 145 may comprise, for example, a touch-sensitive color display screen. In various implementations, display 145 may comprise one or more thin-film transistors (TFT) LCD including embedded transistors. The embodiments, however, are not limited to these examples.

In general operation, apparatus 100 and/or system 140 may be operative to provide suggested sharing recipients for one or more media items 116. In various embodiments, apparatus 100 and/or system 140 may be communicatively coupled to a media capture device 150 and may receive media items 116 captured by media capture device 150. In some embodiments, media capture device 150 may comprise any device capable of capturing video and/or audio effects. Examples of media capture device 150 may include a mobile phone, a smartphone, a camera, a microphone, a video camera, a portable computer, a desktop computer, and/or any other device capable of capturing video and/or audio effects. The embodiments are not limited to these examples. It is worthy of note that although media capture device 150 is illustrated as being external to apparatus 100 and system 140 in FIG. 1, the embodiments are not so limited. In various embodiments, media capture device 150 may be comprised within apparatus 100 and/or system 140. For example, in some embodiments, apparatus 100 may comprise a smartphone, and media capture device 150 may be a camera comprised within that smartphone. In various other embodiments, apparatus 100 and/or system 140 may be comprised within media capture device 150. For example, in some embodiments, media capture device 150 may comprise a video camera, and apparatus 100 and/or system 140 may comprise media management components of that video camera. Other embodiments are both possible and contemplated, and the embodiments are not limited in this context.

It is additionally worthy of note that in various embodiments, in addition to or in lieu of receiving captured media items 116 from media capture device 150, apparatus 100 and/or system 140 may be operative to generate, receive, and/or otherwise obtain media items 116 that do not necessarily originate from media capture device 150. For example, in some embodiments, apparatus 100 and/or system 140 may be operative to receive media items 116 from one or more other devices via transceiver 144. Further, in various embodiments, some media items 116 may not comprise captured content, but rather may comprise content generated in some other fashion. For example, in some embodiments, a particular media item 116 may comprise a sketch produced by a user of a drawing application executed by processor element 102. In another example, a particular media item 116 may comprise an animated video received as an email attachment from a remote device via transceiver 144, or located in a cloud-based storage system and accessed via transceiver 144. The embodiments are not limited to these examples.

In various embodiments, aggregation module 106 may be operative to identify, accumulate, and/or manage contacts 118. In some embodiments, aggregation module 106 may be operative to identify, accumulate, and/or manage communication information 120 during operation of apparatus 100 and/or system 140, and to analyze that communication information 120 in order to identify, accumulate, and/or manage one or more contacts 118. In various embodiments, communication information 120 may comprise information describing communications previously performed by one or more persons, groups, accounts, addresses, telephone numbers, and/or other entities associated with apparatus 100 and/or system 140, and identifying persons, groups, accounts, addresses, telephone numbers, and/or other entities with which those previous communications have been performed.

In some embodiments, aggregation module 106 may be operative to identify, accumulate, and/or manage one or more contacts 118 with which communications have previously been and/or may prospectively be performed via multiple communications methods, such as telephone, email, chat, instant message, text message, social networking, internet media sharing, video conferencing, paging, and/or other communications methods. For example, in various embodiments in which apparatus 100 comprises a smartphone, aggregation module 106 may be operative to identify, accumulate, and/or manage contacts 118 comprising recipients of emails sent from an email application on the smartphone, recipients of messages sent within a social networking application on the smart phone, and recipients of text messages sent via a text messaging application on the smart phone. The embodiments are not limited to this example.

In some embodiments, aggregation module 106 may be operative to automatically identify, accumulate, and/or manage contacts 118, without need for user intervention and/or input. For example, in various embodiments, aggregation module 106 may be operative to search through prior communications performed via one or more communications methods, and to identify contacts 118 based on such prior communications. Additionally or alternatively, in some embodiments, when apparatus 100 and/or system 140 sends or receives any particular communication, aggregation module 106 may be operative to analyze that communication to determine if a sender or recipient should be added to contacts 118. Additionally or alternatively, in various embodiments, aggregation module 106 may be operative to search an "Address Book," "Contacts," or other such datastore implemented in an operating system executed by processor element 102. For example, in some embodiments in which apparatus 100 comprises a smartphone featuring an "Address Book" feature, aggregation module 106 may be operative to search for contacts 118 in a datastore associated with the "Address Book" feature, and also to analyze email, text message, and social networking communications to identify, accumulate, and/or manage other contacts 118 that do not appear within the "Address Book." The embodiments are not limited to this example.

In various embodiments, aggregation module 106 may be operative to manage contacts 118 in such a fashion as to regard different manners of communicating with a same entity as distinct contacts 118. In an example embodiment, rather than generating a single contact 118 for a person "Bob" and associating Bob's email address, mobile phone number, and social networking screen name with that single contact 118, aggregation module 106 may be operative to generate a first contact 118 corresponding to communication with Bob by email, a second contact 118 corresponding to text message communication with Bob, and a third contact 118 corresponding to social networking communication with Bob. Hereinafter, with respect to the management of contacts 118, the term "path-specific" shall be employed to refer to the treatment of different manners of communication with the same entity as distinct contacts 118. The aforementioned example regarding the various means of communication with Bob comprises an example of an embodiment implementing path-specific contacts 118. It is worthy of note that the implementation of path-specific contacts 118 is not mutually exclusive with the implementation of non-path-specific contacts 118. In some embodiments, for example, aggregation module 106 may be operative to maintain contacts 118 such that it retains sufficient information for both path-specific and non-path-specific implementations and is capable of switching between the two. The embodiments are not limited in this context.

In various embodiments, aggregation module 106 may be operative to manage contacts 118 in such a fashion that a particular contact 118 may correspond to a group of people, accounts, addresses, telephone numbers, and/or other entities. For example, in some embodiments, some contacts 118 may correspond to mailing lists, social networking groups or circles, and/or sets of multiple telephone numbers. In various embodiments, some contacts 118 that correspond to such groups may be non-path-specific and may be associated with multiple manners of communication. In an example embodiment, a particular contact 118 may correspond to communications with each of a group of people by both email and text message. The embodiments are not limited to these examples.

In some embodiments, when apparatus 100 and/or system 140 receives, generates, captures, or otherwise obtains any particular media item 116, classification module 108 may be operative to assign that media item 116 to one of one or more content categories 122. In various embodiments, each content category 122 may correspond to a particular generalized description of the content of media items 116 assigned to that content category 122. For example, a "mainly people" content category 122 may be designated for media items 116 comprising pictures or videos of persons or groups of people, while a "mainly scenery" content category 122 may be designated for media items 116 comprising pictures or videos that do not prominently feature particular persons or groups of people. It is to be understood that numerous alternate and/or additional content categories 122 are both possible and contemplated, and the embodiments are not limited to these examples.

In some embodiments, classification module 108 may be operative to perform one or more feature recognition techniques in order to identify one or more features in a media item 116, and may be operative to assign the media item 116 to a content category 122 based on the presence and/or absence of such features. In various embodiments, classification module 108 may be operative to perform one or more feature recognition techniques in order to identify features such as, for example, faces, persons, groups, crowds, landmarks, monuments, lakes, mountains, roads, trees, buildings, structures, speech, sounds and/or other features. In an example embodiment in which a media item 116 comprises a photograph, classification module 108 may be operative to perform a facial recognition technique to identify a face in the photograph. In a second example embodiment in which a media item 116 comprises an audio recording, classification module 108 may be operative to perform a speech recognition technique to identify speech within the audio recording. The embodiments are not limited to these examples.

In some embodiments, correlation module 110 may be operative to determine context information 124 for one or more media items 116. In various embodiments, the context information 124 for any particular media item 116 may comprise information, logic, data, and/or instructions describing circumstances, conditions, properties, facts, and/or other information relevant to the capture, generation, and/or reception of that media item 116, and/or the content of that media item 116. In some embodiments, the context information 124 for a particular media item 116 may comprise information indicating a location of capture of the media item 116, and may be determined based on global positioning system (GPS) data and/or other geo-location system data. In various embodiments, the context information 124 for a particular media item 116 may additionally or alternatively indicate a time at which the media item 116 was captured, and/or indicate a person that captured the media item 116 or from whom the media item 116 was received. In some embodiments, the context information 124 for a particular media item 116 may additionally or alternatively comprise information indicating an event with which the media item 116 is associated. In various embodiments, the context information 124 for a particular media item 116 may additionally or alternatively comprise information describing features within the media item 116, such as faces, persons, or landscape elements. In some embodiments, the context information 124 for a particular media item 116 may additionally or alternatively comprise information describing technical properties of the media item 116, such as a size, resolution, bit rate, color depth, sampling rate, and/or other technical property, and/or may comprise metadata for the media item 116. Other types of context information 124 are both possible and contemplated, and the embodiments are not limited in this context.

In various embodiments, correlation module 110 may be operative to cooperate with one or more other components of apparatus 100 and/or system 140 in determining context information 124. In some embodiments, for example, aggregation module 106 may be operative to identify, accumulate, and/or manage event information 126, and correlation module 110 may be operative to determine context information 124 for one or more media items 116 based on event information 126. In various embodiments, event information 126 may comprise information, logic, data, and/or instructions describing events that may be pertinent to a user of apparatus 100 and/or system 140 and/or to persons from whom apparatus 100 and/or system 140 may receive media items 116. Such events may comprise, for example, meetings, conferences, parties, lectures, anniversaries, holidays, and/or other events of interest. In some embodiments, aggregation module 106 may be operative to obtain event information 126 by analyzing entries in a "Calendar" application executed by processor element 102, to determine events of relevance to a user of apparatus 100 and/or system 140. In an example embodiment, aggregation module 106 may be operative to identify a calendar entry indicating that a user will attend a birthday party on a particular date and time and in a particular location, and may create event information 126 corresponding to the birthday party. In various embodiments, aggregation module 106 may additionally or alternatively be operative to generate event information 126 by analyzing communication information 120 and identifying events that have been discussed in previous communications. In an example embodiment, aggregation module 106 may be operative to analyze social network postings to determine that a user of apparatus 100 and/or system 140 will be on vacation starting on a particular date. The embodiments are not limited to these examples.

In some embodiments, correlation module 110 may be operative to determine particular context information 124 for a media item 116 based on features identified by classification module 108 in the course of assigning the media item 116 to a content category 122. For example, in various embodiments, classification module 108 may be operative to identify the faces of particular contacts 118 within a media item 116 and to assign the media item 116 to a "mainly people" category, and correlation module 110 may be operative to create context information 124 for the media item 116 indicating that those contacts 118 appear within the media item 116. In some embodiments, classification module 108 may be operative to assign a media item 116 to a content category 122 based on context information 124 provided by correlation module 110. In an example embodiment, correlation module 110 may be operative to generate context information 124 indicating that a media item 116 corresponds to a particular event described by event information 126, and classification module 108 may be operative to assign the media item 116 to a content category 122 based on its correspondence with that particular event. The embodiments are not limited to these examples.

In various embodiments, aggregation module 106 may be operative to identify, accumulate, and/or manage sharing history 128 during operation of apparatus 100 and/or system 140. In some embodiments, sharing history 128 may comprise information, logic, data, and/or instructions identifying and/or describing previously performed sharing operations. In various embodiments, sharing history 128 identify media items 116 that have previously been shared, and may include context information 124 for those previously shared media items 116. In various embodiments, classification module 108 may be operative to assign one or more media items 116 to content categories 122 based on sharing history 128. In an example embodiment, classification module 108 may be operative to determine, based on sharing history 128, that a media item 116 comprises images of persons with whom other media items 116 have frequently been shared in the past, and may assign the media item 116 to a particular content category 122 based on that determination. In some embodiments, correlation module 110 may be operative to generate context information 124 for one or more media items 116 based on sharing history 128. In an example embodiment, classification module 108 may be operative to determine, based on sharing history 128, that a media item 116 comprises images of persons with whom other media items 116 have frequently been shared in the past, and may generate context information 124 for the media item 116 that indicates that the media item 116 is likely to pertain to a group of friends of a user. The embodiments are not limited to these examples.

In various embodiments, for any given media item 116, estimation module 112 may be operative to determine a set of relevance values 130 for a set of contacts 118. In some embodiments, the set of contacts 118 may comprise all of contacts 118 or may comprise a subset of contacts 118. Such a set of relevance values 130 may be regarded as corresponding to the given media item 116, and each relevance value 130 in the set may comprise an estimate of a level of relevance of the media item 116 to a respective one of the set of contacts 118, and/or an estimate of a likelihood that sharing the media item 116 with the respective one of the set of contacts 118 may be desirable. For example, if contacts 118 comprise three contacts "A," "B," and "C," and apparatus 100 and/or system 140 receives a media item 116 comprising a photograph, estimation module 112 may be operative to determine a set of three relevance values 130. In this example, each of the relevance values 130 in the set may correspond to one of the contacts A, B, or C, and may comprise an estimate of a level of relevance of the photograph to a respective one of contacts A, B, or C. The embodiments are not limited to this example.

In various embodiments, estimation module 112 may be operative to determine the relevance values 130 corresponding to one or more contacts 118 based on sharing history 128 associated with those contacts 118. In some such embodiments, estimation module 112 may be operative to determine the relevance values 130 corresponding to one or more contacts 118 based on the frequency with which the one or more contacts 118 have been selected as sharing recipients in the past. For example, in various embodiments, estimation module 112 may be operative to determine the relevance values 130 corresponding to one or more contacts 118 according to the equation:

$$RV_i = m_i / M;$$

where $RV_i$ represents a relevance value 130 for an $i^{th}$ contact 118, $m_i$ represents a number of times that the $i^{th}$ contact 118 has been selected as a sharing recipient over a particular time period, and M represents a total number of sharing instances during that particular time period. The embodiments are not limited to this example.

In some embodiments, estimation module 112 may be operative to determine the relevance values 130 corresponding to one or more contacts 118 based on amounts of time that have elapsed since those contacts have been selected as sharing recipients. In various embodiments, estimation module 112 may be operative to determine larger relevance values 130 for contacts 118 that have been selected as sharing recipients more recently, and to determine smaller relevance values 130 for contacts 118 that have not recently been selected as sharing recipients. In some embodiments, estimation module 112 may be operative determine relevance values 130 such that contacts 118 that have not been selected as sharing recipients within a defined preceding time period are excluded from consideration. In an example embodiment, estimation module 112 may be operative to determine a relevance value 130 equal to zero for any contact 118 that has not been selected as a sharing recipient within the past year. The embodiments are not limited to this example.

In various embodiments, estimation module 112 may be operative to determine relevance values 130 such that contacts 118 matching certain criteria are automatically identified as potential sharing recipients, regardless of the communications histories associated with those contacts 118. In some embodiments, for example, estimation module 112 may be operative to determine relevance values 130 such that for any particular media item 116, contacts 118 that appear in that media item 116 are assigned the maximum possible relevance values 130. In an example embodiment, for a media item 116 comprising a picture of a person "Peggy," estimation module 112 may be operative to assign a maximum possible relevance value 130 to a contact 118 corresponding to Peggy. The embodiments are not limited to this example.

In various embodiments, estimation module 112 may be operative to utilize a naïve Bayes classifier and/or one or more other machine learning methods to refine the determination of relevance values 130 for contacts 118 as sharing recipients are determined for each successive media item 116 over time. In some embodiments, each time a media item 116 is shared, estimation module 112 may be operative to update the naïve Bayes classifier based on the sharing recipients selected for that media item 116. In various embodiments, the naïve Bayes classifier may differentiate between media items 116 assigned to differing content categories 122, such that when any particular media item 116 assigned to a particular content category 122 is shared, the naïve Bayes classifier is updated only with respect to the determination of relevance values 130 for contacts 118 in the determination of sharing recipients for subsequent media items 116 that are assigned to that same content category 122. The embodiments are not limited in this context.

In some embodiments, estimation module 112 may be operative to determine the relevance values 130 corresponding to one or more contacts 118 based on communications information 120. In various embodiments, aggregation module 106 may not yet have accumulated sharing history 128, and estimation module 112 may thus be operative to determine the relevance values 130 based on communications history characteristics described in communications information 120. In some such embodiments, estimation module 112 may be operative to infer a "social closeness" of any particular contact 118 based on a frequency with which communications have been conducted with that particular contact 118, the durations of communications that have been conducted with that particular contact 118, and/or the amount of time that has elapsed since the most recent communication with that particular contact 118. In various embodiments, the past communications for each contact 118 may be parsed into "buckets" corresponding to discrete segments of past time, and respective communications frequencies and/or communications durations may be determined for each bucket. For example, in some embodiments, estimation module 112 may be operative to parse past communications into weekly buckets, and to determine, for each of one or more contacts 118, communications frequencies and/or communications durations corresponding to each weekly bucket. The embodiments are not limited to this example.

In various embodiments in which past communications are parsed into buckets, estimation module 112 may be operative to normalize measures of the communications frequencies and/or communications durations for the various buckets. Continuing with the above example in which past communications are parsed into weekly buckets, estimation module 112 may be operative to normalize measures of the communications frequencies and/or communications durations for the weekly buckets according to the equation:

$$x'_{ij} = x_{ij} / \max_j;$$

where $x_{ij}$ represents the sum of the measured parameter over the $i^{th}$ weekly bucket for the $j^{th}$ contact, $\max_j$ represents the maximum value for the measured parameter for the $j^{th}$ contact over all of the weekly buckets, and $x'_{ij}$ represents the normalized sum of the measured parameter over the $i^{th}$ weekly bucket for the $i^{th}$ contact. In some embodiments, estimation module 112 may be operative to determine average normalized values describing communications frequencies and/or communications durations over all weekly buckets according to the equation:

$$X_j = \Sigma_{i=1}^{N} x'_{ij} / N;$$

where $x'_{ij}$ represents the normalized sum of the measured parameter over the $i^{th}$ weekly bucket for the $j^{th}$ contact, N indicates the total number of weekly buckets, and $X_j$ indicates the average normalized sum for the measured parameter over all of the N weekly buckets. In various embodiments, rather than merely determining an average of the weekly normalized sums, estimation module 112 may be operative to determine respective weights for each of the weekly normalized sums and to determine a weighted average of the weekly normalized sums based on those weights. In some embodiments, estimation module 112 may be operative to assign greater weights to more recent weekly buckets, and to assign lesser weights to less recent weekly buckets, in order to weight more recent communications more heavily. It is to be understood that differing weights might likewise be utilized in embodiments in which weekly buckets are not utilized, and the embodiments are not limited in this context.

In some embodiments, estimation module 112 may be operative to determine the relevance values 130 corresponding to one or more contacts 118 as a weighted sum of a set of parameters describing a set of respective communications history characteristics. Such parameters may be referred to as communications history parameters. In various such embodiments, the set of communications history parameters may comprise distinct parameters describing the frequencies and/or durations of communications via different manners of communication. For example, in one such embodiment, one communications history parameter may describe a frequency of telephone and text message communications with a particular contact 118, while a different communications history parameter may describe a frequency of email, web, and social network communication with that particular contact 118. In some embodiments, estimation module 112 may be operative to determine relevance values 130 corresponding to one or more contacts 118 as a weighted sum according to the equation:

$$s_j = \alpha D_j + \beta F_j + \mu I_j;$$

where $\alpha$, $\beta$, and $\mu$ represent empirically determined coefficients, $D_j$ represents an average normalized communication duration with a $j^{th}$ contact, $F_j$ represent an average normalized telephone and text message communication frequency with the $j^{th}$ contact, $I_j$ represents an average normalized email, web, and social network communication frequency with the $j^{th}$ contact, and $s_j$ represents a weighed sum for the $j^{th}$ contact. The embodiments are not limited to this example.

In various embodiments, estimation module 112 may be operative to generate a set of suggested recipients 132. In some embodiments, estimation module 112 may be operative to generate the set of suggested recipients 132 based on relevance values 130. In various embodiments, estimation module 112 may be operative to select the suggested recipients 132 from among contacts 118 based on relevance values 130. For example, in some embodiments, estimation module 112 may be operative to determine suggested recipients 132 as a certain number of contacts 118 having the highest corresponding relevance values 130. In various embodiments, estimation module 112 may be operative to order suggested recipients 132. For example, in some embodiments, estimation module 112 may be operative to order suggested recipients 132 in order of their corresponding relevance values 130. In various embodiments, rather than determining suggested recipients 132 as a subset of contacts 118, estimation module 112 may be operative to include all of contacts 118 in suggested recipients 132. In some such embodiments, estimation module 112 may be operative to simply determine suggested recipients 132 as contacts 118 arranged in order of their corresponding relevance values 130. The embodiments are not limited to these examples.

As noted above, in various embodiments, aggregation module 106 may be operative to manage contacts 118 in a path-specific fashion, such that different manners of communicating with a same entity are regarded as distinct contacts 118. Similarly, in some embodiments, estimation module 112 may be operative to implement suggested recipients 132 in a path-specific fashion, such that different manners of communicating with a same entity are evaluated separately. In various such embodiments, for example, estimation module 112 may be operative to determine distinct path-specific relevance values 130 for each of multiple manners of communicating with a same entity, and may be operative to evaluate those path-specific relevance values 130 and their corresponding path-specific contacts 118 separately when generating and/or ordering suggested recipients 132. In an example embodiment, estimation module 112 may determine that a first path-specific contact 118 corresponding to email communication with a person "Sue" should be included in suggested recipients 132, but may determine that a second path-specific contact 118 corresponding to text message communication with Sue should not be included in suggested recipients 132. The embodiments are not limited to this example.

As noted above, in some embodiments, aggregation module 106 may be operative to manage contacts 118 in such a fashion that a particular contact may correspond to a group of people or other entities. Similarly, in various embodiments, estimation module 112 may be operative to implement suggested recipients 132 such that such a group may be identified as a single suggested recipient 132. For example, in some embodiments, estimation module 112 may be operative to identify suggested recipients 132 that comprise social networking groups or circles. The embodiments are not limited to this example.

In various embodiments, apparatus 100 and/or system 140 may be operative on display 145 to present a recipient selection interface 146 based on the set of suggested recipients 132. In some embodiments, the recipient selection interface 146 may comprise any combination of one or more lists, menus, dialogs, prompts, buttons, icons, checkboxes, and/or other display elements enabling a user to select one or more of suggested recipients 132 as sharing recipients of media item 116. For example, in various embodiments, suggested recipients 132 may comprise an ordered subset of contacts 118 corresponding to the highest determined relevance values 130, and recipient selection interface 146 may enable the selection of some, all, or none of that subset of contacts 118 as sharing recipients of the media item 116. In some embodiments in which path-specific contacts 118 are utilized, the suggested recipients 132 presented for selection via recipient selection interface 146 may comprise path-specific contacts 118, such that each presented suggested recipient 132 comprises a particular manner of communication with a particular entity. The embodiments are not limited in this context.

It is worthy of note that recipient selection interface 146 need not limit the possible recipient selections to those comprised by suggested recipients 132. For example, in various embodiments, suggested recipients 132 may comprise a certain number of "most relevant" contacts 118, and recipient selection interface 146 may highlight and enable quick selection from among those most relevant contacts 118 while still permitting selection from among any remaining contacts 118. In a particular example embodiment, recipient selection interface 146 may present a set of most relevant contacts 118 at the top of a list and ordered relevance, and may populate the remainder of the list with the remainder of contacts 118 ordered alphabetically. The embodiments are not limited to this example.

In some embodiments, apparatus 100 and/or system 140 may be operative to generate and/or receive selected recipient information 148. Selected recipient information 148 may comprise information, logic, instructions, and/or data identifying one or more selected recipients 149 with which media item 116 is to be shared. In various embodiments, a user may enter input into an input device 147 in order to utilize recipient selection interface 146, and apparatus 100 and/or system 140 may be operative to generate selected recipient information 148 based on the user's inputs. In some embodiments, selected recipients 149 may comprise some, all, or none of suggested recipients 132, and/or may comprise some, all, or none of contacts 118 not included within suggested recipients 132. The embodiments are not limited in this context.

In various embodiments, sharing module 114 may be operative to share media item 116 with selected recipients 149. In some embodiments, sharing module 114 may be operative to share media item 116 with selected recipients 149 using one or more sharing techniques, which may involve one or more communications methods. Examples of sharing techniques that may be utilized by sharing module 114 according to various embodiments may include sending an email, text message, or social networking message, and/or generating a social networking post, blog, or "tweet." In some embodiments, apparatus 100 and/or system 140 may be operative to prompt a user for a selection of one or more sharing techniques. In various embodiments, apparatus 100 and/or system 140 may additionally or alternatively may be operative to determine one or more sharing techniques to be utilized, based on sharing history 128, context information 124, and/or on other information. In some embodiments, sharing module 114 may be operative to utilize a same sharing technique in order to share media item 116 with each selected recipient 149. In various other embodiments, sharing module 114 may be operative to utilize different sharing techniques to share media item 116 with different selected recipients 149. For example, in some embodiments in which selected recipients 149 comprise path-specific contacts 118, sharing module 114 may be operative to share media item 116 with each selected recipient 149 by utilizing its corresponding communications method. The embodiments are not limited in this context.

In various embodiments, when generating a communication to share any particular media item 116, sharing module 114 may be operative to include one or more portions of context information 124 for that media item 116 in that communication. In some such embodiments, sharing module 114 may be operative to populate one or more portions and/or fields of the communication with one or more portions of context information 124. In an example embodiment, when generating an email to share a picture, sharing module 114 may be operative to populate a "Subject" field of the email with a name and date of an event at which the picture was captured, and/or to populate a "Body" field of the email with a location of the event, a description of the event, a list of event attendees, a description of the weather during the event, or other context information 124 associated with the picture. The embodiments are not limited to these examples.

Operations for the above embodiments may be further described with reference to the following figures and accompanying examples. Some of the figures may include a logic flow. Although such figures presented herein may include a particular logic flow, it can be appreciated that the logic flow merely provides an example of how the general functionality as described herein can be implemented. Further, the given logic flow does not necessarily have to be executed in the order presented unless otherwise indicated. In addition, the given logic flow may be implemented by a hardware element, a software element executed by a processor element, or any combination thereof. The embodiments are not limited in this context.

Figure 2:
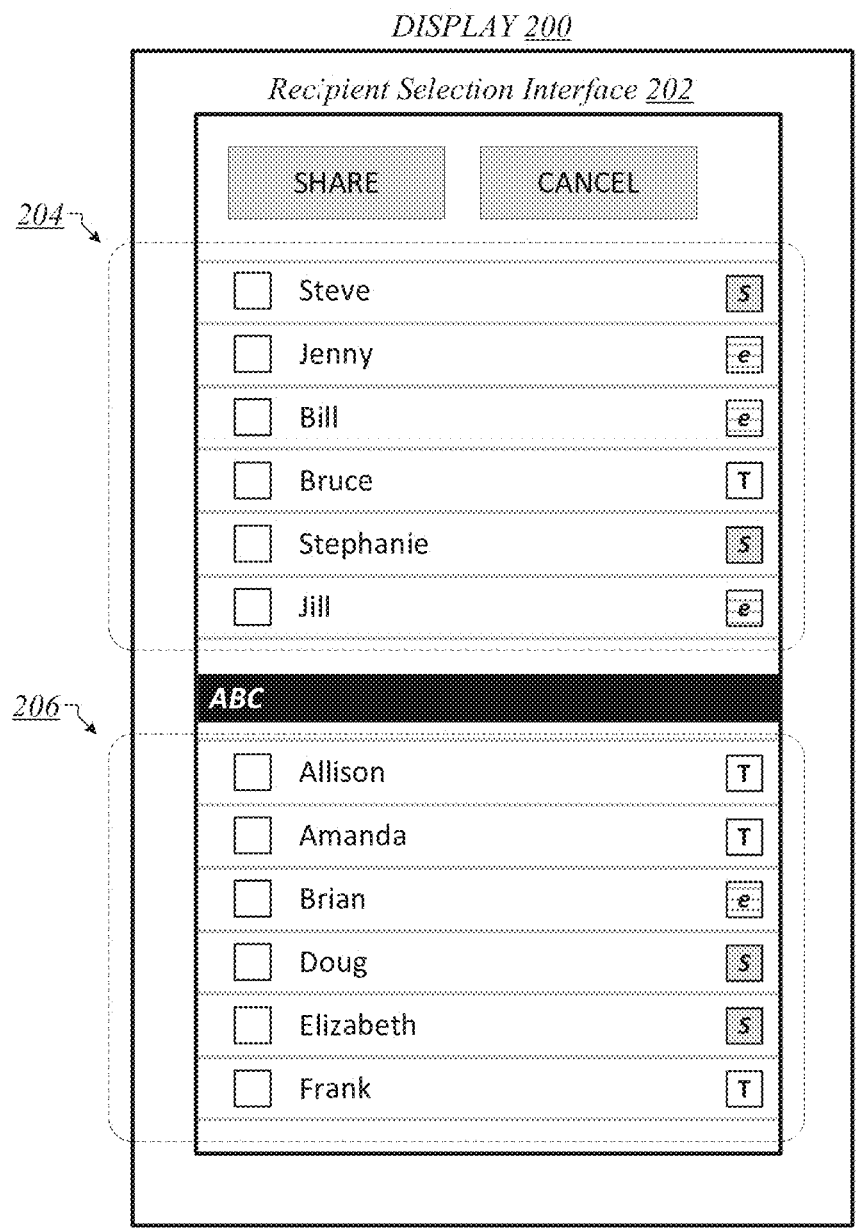
FIG. 2 illustrates a display operative to present an embodiment of a recipient selection interface.

FIG. 2 illustrates a display 200 operative to present a recipient selection interface 202 according to various embodiments. More particularly, recipient selection interface 202 comprises an example of a recipient selection interface in which suggested recipients comprise path-specific contacts. As shown in FIG. 2, an icon next to each suggested recipient indicates a specific manner of communication associated with that suggested recipient. For example, a social networking icon next to the first suggested recipient Steve indicates that media items shared with Steve are shared via social network messaging. Portion 204 of the suggested recipient list includes the first six suggested recipients, which may comprise suggested recipients that have been determined to be the six most likely to be selected as sharing recipients. The suggested recipients in portion 204 are not arranged alphabetically, but rather may be arranged in order of their corresponding relevance values. For example, the suggested recipient that appears at the top of the list may correspond to a highest relevance value. In contrast, the suggested recipients in portion 206, which may have been determined to be less likely to be selected as sharing recipients, are arranged in alphabetical order. The embodiments are not limited in this context.

Figure 3:
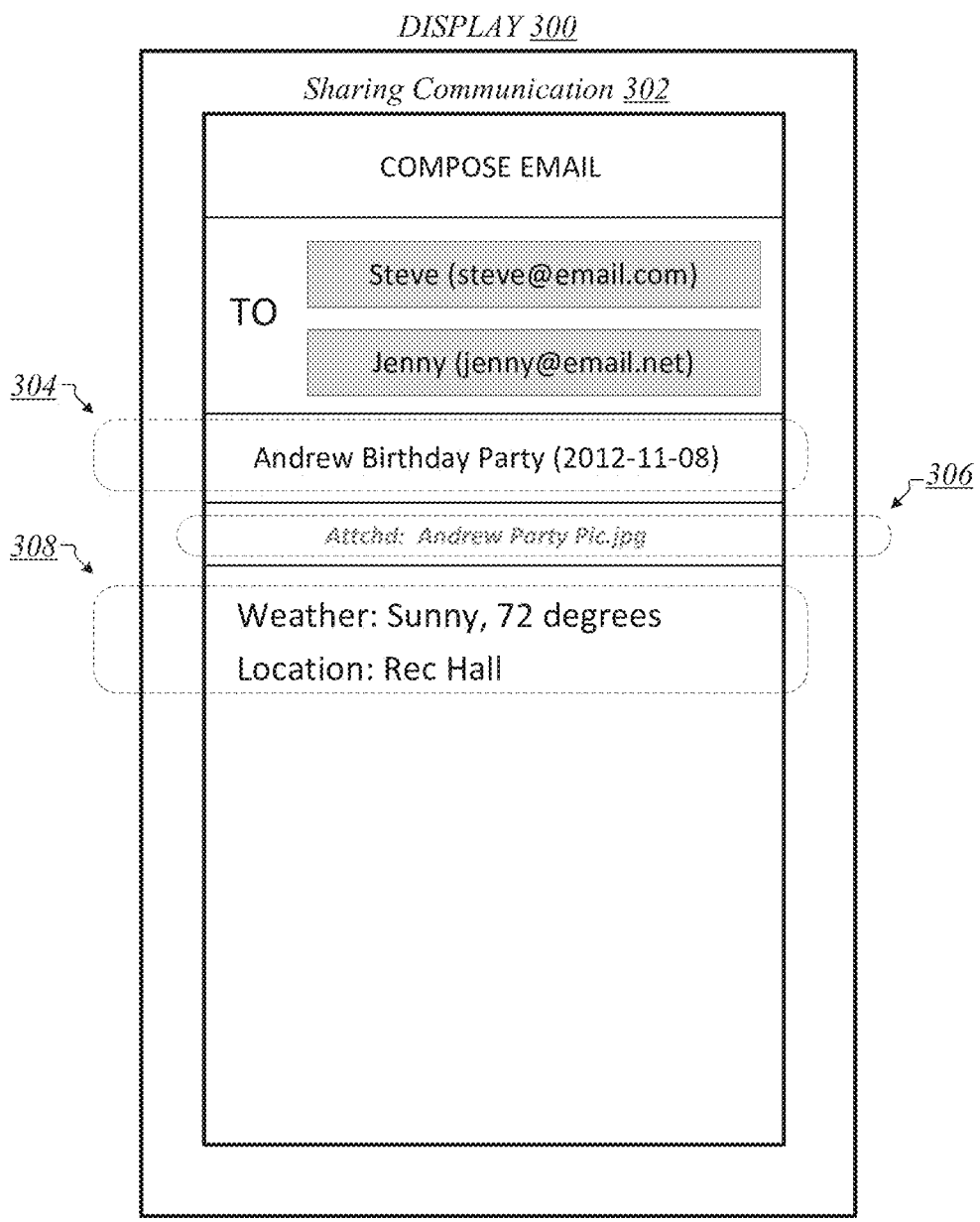
FIG. 3 illustrates a display operative to present an embodiment of a sharing communication.

FIG. 3 illustrates a display 300 operative to present an example of a sharing communication 302 according to some embodiments. More particularly, sharing communication 302 comprises an example of a composed email in which fields have been populated with context information, such as may be generated by sharing module 114 of FIG. 1 using context information 124. As shown in FIG. 3, a subject field 304 has been populated with context information identifying an event named "Andrew Birthday Party" and specifying the date of that event. Additionally, an attachment field 306 indicates that a picture "Andrew Party Pic.jpg" has been attached. Further, a body field 308 has been populated with context information describing the weather during the event and the location of the event. The embodiments are not limited to these examples.

Figure 4:
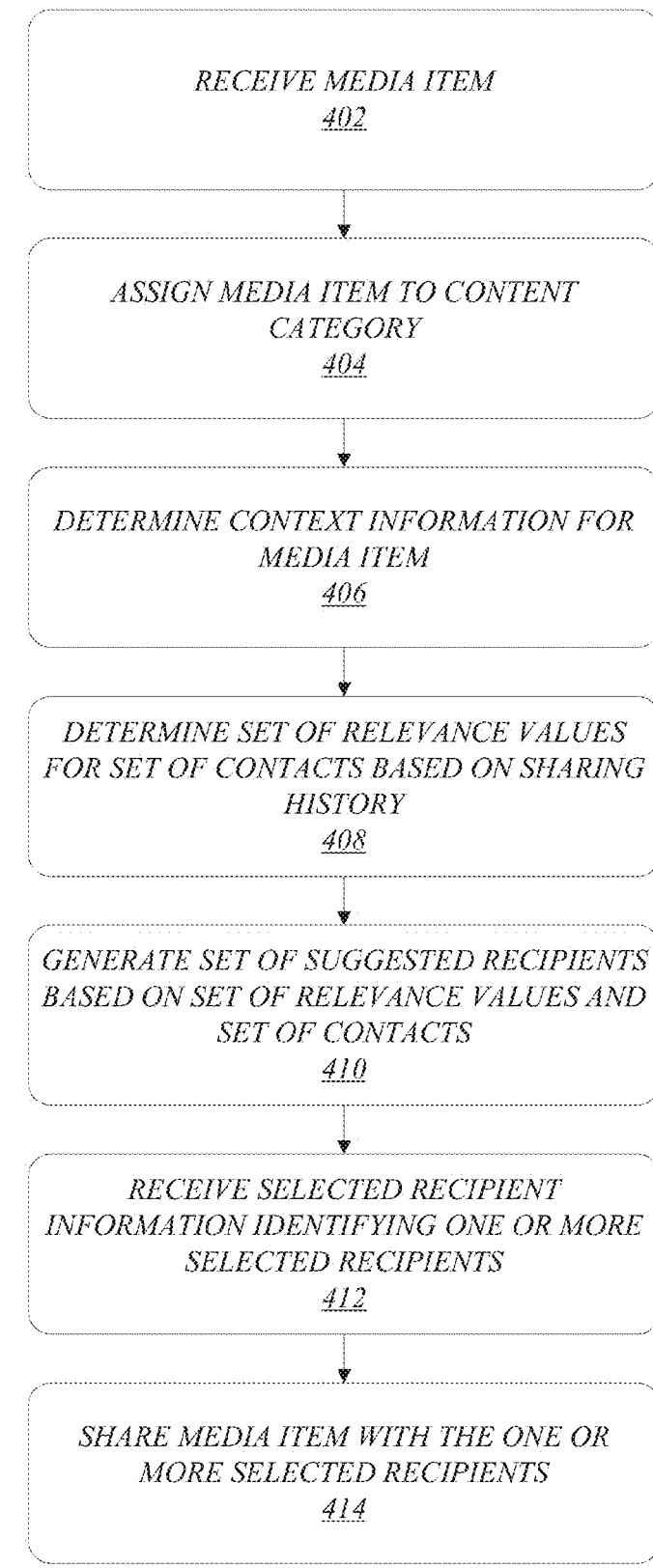
FIG. 4 illustrates one embodiment of a logic flow.

FIG. 4 illustrates one embodiment of a logic flow 400, which may be representative of the operations executed by one or more embodiments described herein. As shown in logic flow 400, a media item may be received at 402. For example, apparatus 100 and/or system 140 of FIG. 1 may be operative to receive media item 116. At 404, the media item may be assigned to a content category. For example, classification module 108 of FIG. 1 may be operative to assign the media item media item 116 to a content category 122. At 406, context information for the media item may be determined. For example, correlation module 110 of FIG. 1 may be operative to determine context information 124 for the media item 116. At 408, a set of relevance values may be determined for a set of contacts based on a sharing history. For example, for the received media item 116, estimation module 112 may be operative to determine a set of relevance values 130 for a set of contacts 118. At 410, a set of suggested recipients may be generated based on the set of relevance values and the set of contacts. For example, for the received media item 116, estimation module 112 of FIG. 1 may be operative to generate a set of suggested recipients 132 based on the set of relevance values 130 and the set of contacts 118. At 412, selected recipient information may be received that identifies one or more selected recipients. For example, apparatus 100 and/or system 140 of FIG. 1 may be operative to receive selected recipient information 148 that identifies one or more selected recipients 149. At 414, the media item may be shared with the one or more selected recipients. For example, sharing module 114 may be operative to send one or more sharing messages to share the media item 116 with the selected recipients 149. The embodiments are not limited to these examples.

FIG. 5 illustrates an embodiment of a storage medium 500. Storage medium 500 may comprise an article of manufacture. In some embodiments, storage medium 500 may include any non-transitory computer readable medium or machine readable medium, such as an optical, magnetic or semiconductor storage. Storage medium 500 may store various types of computer executable instructions, such as instructions to implement logic flow 400. Examples of a computer readable or machine readable storage medium may include any tangible media capable of storing electronic data, including volatile memory or non-volatile memory, removable or non-removable memory, erasable or non-erasable memory, writeable or re-writeable memory, and so forth. Examples of computer executable instructions may include any suitable type of code, such as source code, compiled code, interpreted code, executable code, static code, dynamic code, object-oriented code, visual code, and the like. The examples are not limited in this context.

Figure 6:
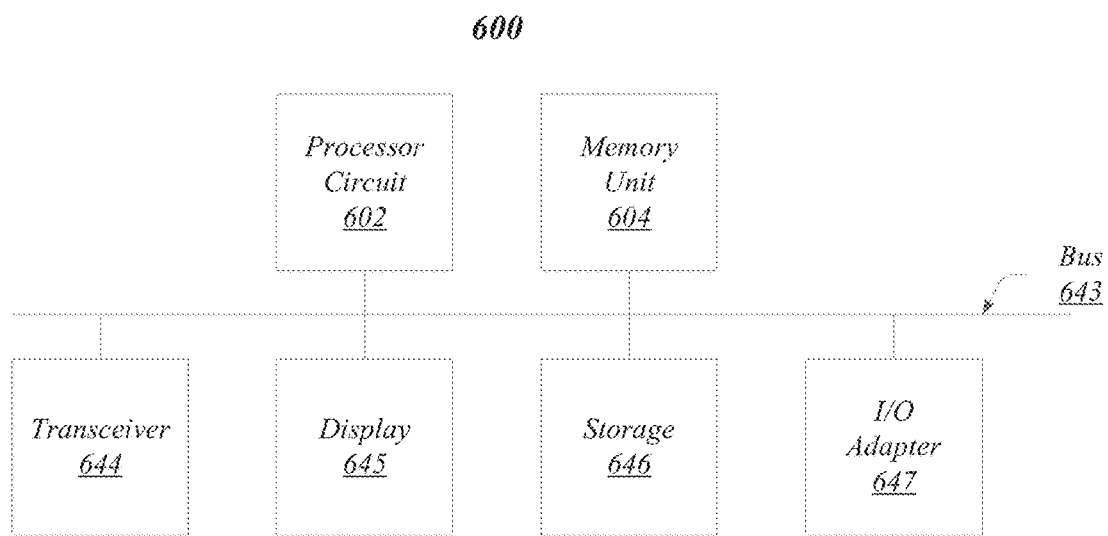
FIG. 6 illustrates one embodiment of a second system.

FIG. 6 illustrates one embodiment of a system 600. In various embodiments, system 600 may be representative of a system or architecture suitable for use with one or more embodiments described herein, such as apparatus 100 and/or system 140 of FIG. 1, logic flow 400 of FIG. 4, and/or storage medium 500 of FIG. 5. The embodiments are not limited in this respect.

As shown in FIG. 6, system 600 may include multiple elements. One or more elements may be implemented using one or more circuits, components, registers, processors, software subroutines, modules, or any combination thereof, as desired for a given set of design or performance constraints. Although FIG. 6 shows a limited number of elements in a certain topology by way of example, it can be appreciated that more or less elements in any suitable topology may be used in system 600 as desired for a given implementation. The embodiments are not limited in this context.

In various embodiments, system 600 may include a processor element 602. Processor element 602 may be implemented using any processor or logic device, and may be the same as or similar to processor element 102 of FIG. 1.

In one embodiment, system 600 may include a memory unit 604 to couple to processor element 602. Memory unit 604 may be coupled to processor element 602 via communications bus 643, or by a dedicated communications bus between processor element 602 and memory unit 604, as desired for a given implementation. Memory unit 604 may be implemented using any machine-readable or computer-readable media capable of storing data, including both volatile and non-volatile memory, and may be the same as or similar to memory unit 104 of FIG. 1. In some embodiments, the machine-readable or computer-readable medium may include a non-transitory medium. The embodiments are not limited in this context.

In various embodiments, system 600 may include a transceiver 644. Transceiver 644 may include one or more radios capable of transmitting and receiving signals using various suitable wireless communications techniques, and may be the same as or similar to transceiver 144 of FIG. 1.

In various embodiments, system 600 may include a display 645. Display 645 may comprise any display device capable of displaying information received from processor element 602, and may be the same as or similar to display 145 of FIG. 1. The embodiments are not limited in this context.

In various embodiments, system 600 may include storage 646. Storage 646 may be implemented as a non-volatile storage device such as, but not limited to, a magnetic disk drive, optical disk drive, tape drive, an internal storage device, an attached storage device, flash memory, battery backed-up SDRAM (synchronous DRAM), and/or a network accessible storage device. In embodiments, storage 646 may include technology to increase the storage performance enhanced protection for valuable digital media when multiple hard drives are included, for example. Further examples of storage 646 may include a hard disk, floppy disk, Compact Disk Read Only Memory (CD-ROM), Compact Disk Recordable (CD-R), Compact Disk Rewriteable (CD-RW), optical disk, magnetic media, magneto-optical media, removable memory cards or disks, various types of DVD devices, a tape device, a cassette device, or the like. The embodiments are not limited in this context.

In various embodiments, system 600 may include one or more I/O adapters 647. Examples of I/O adapters 647 may include Universal Serial Bus (USB) ports/adapters, IEEE 1394 Firewire ports/adapters, and so forth. The embodiments are not limited in this context.

Figure 7:
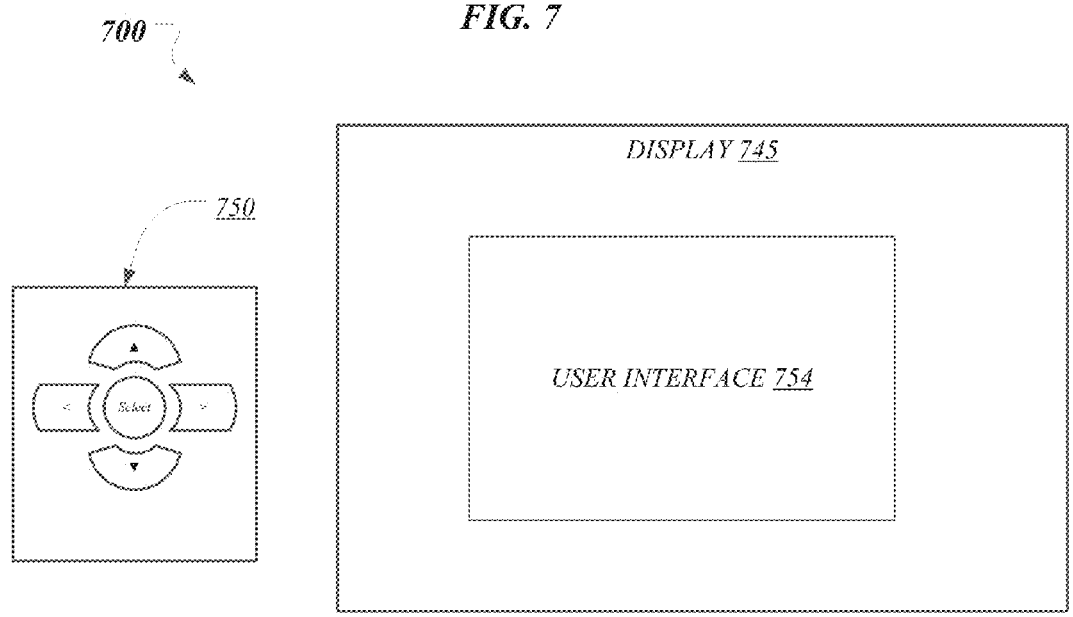
FIG. 7 illustrates one embodiment of a third system.
Figure 7:
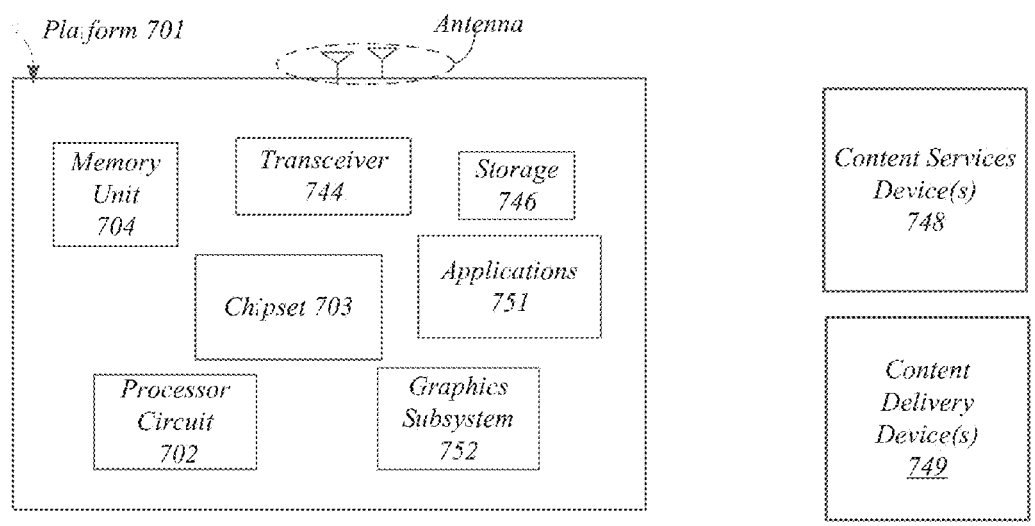
Figure 7:
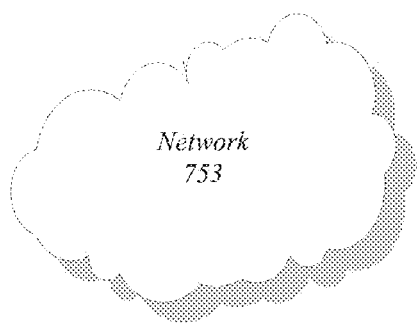

FIG. 7 illustrates an embodiment of a system 700. In various embodiments, system 700 may be representative of a system or architecture suitable for use with one or more embodiments described herein, such as apparatus 100 and/or system 140 of FIG. 1, logic flow 400 of FIG. 4, storage medium 500 of FIG. 5, and/or system 600 of FIG. 6. The embodiments are not limited in this respect.

As shown in FIG. 7, system 700 may include multiple elements. One or more elements may be implemented using one or more circuits, components, registers, processors, software subroutines, modules, or any combination thereof, as desired for a given set of design or performance constraints. Although FIG. 7 shows a limited number of elements in a certain topology by way of example, it can be appreciated that more or less elements in any suitable topology may be used in system 700 as desired for a given implementation. The embodiments are not limited in this context.

In embodiments, system 700 may be a media system although system 700 is not limited to this context. For example, system 700 may be incorporated into a personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth.

In embodiments, system 700 includes a platform 701 coupled to a display 745. Platform 701 may receive content from a content device such as content services device(s) 748 or content delivery device(s) 749 or other similar content sources. A navigation controller 750 including one or more navigation features may be used to interact with, for example, platform 701 and/or display 745. Each of these components is described in more detail below.

In embodiments, platform 701 may include any combination of a processor element 702, chipset 703, memory unit 704, transceiver 744, storage 746, applications 751, and/or graphics subsystem 752. Chipset 703 may provide intercommunication among processor element 702, memory unit 704, transceiver 744, storage 746, applications 751, and/or graphics subsystem 752. For example, chipset 703 may include a storage adapter (not depicted) capable of providing intercommunication with storage 746.

Processor element 702 may be implemented using any processor or logic device, and may be the same as or similar to processor element 602 in FIG. 6.

Memory unit 704 may be implemented using any machine-readable or computer-readable media capable of storing data, and may be the same as or similar to memory unit 604 in FIG. 6.

Transceiver 744 may include one or more radios capable of transmitting and receiving signals using various suitable wireless communications techniques, and may be the same as or similar to transceiver 644 in FIG. 6.

Display 745 may include any television type monitor or display, and may be the same as or similar to display 645 in FIG. 6.

Storage 746 may be implemented as a non-volatile storage device, and may be the same as or similar to storage 646 in FIG. 6.

Graphics subsystem 752 may perform processing of images such as still or video for display. Graphics subsystem 752 may be a graphics processing unit (GPU) or a visual processing unit (VPU), for example. An analog or digital interface may be used to communicatively couple graphics subsystem 752 and display 745. For example, the interface may be any of a High-Definition Multimedia Interface, DisplayPort, wireless HDMI, and/or wireless HD compliant techniques. Graphics subsystem 752 could be integrated into processor element 702 or chipset 703. Graphics subsystem 752 could be a stand-alone card communicatively coupled to chipset 703.

The graphics and/or video processing techniques described herein may be implemented in various hardware architectures. For example, graphics and/or video functionality may be integrated within a chipset. Alternatively, a discrete graphics and/or video processor may be used. As still another embodiment, the graphics and/or video functions may be implemented by a general purpose processor, including a multi-core processor. In a further embodiment, the functions may be implemented in a consumer electronics device.

In embodiments, content services device(s) 748 may be hosted by any national, international and/or independent service and thus accessible to platform 701 via the Internet, for example. Content services device(s) 748 may be coupled to platform 701 and/or to display 745. Platform 701 and/or content services device(s) 748 may be coupled to a network 753 to communicate (e.g., send and/or receive) media information to and from network 753. Content delivery device(s) 749 also may be coupled to platform 701 and/or to display 745.

In embodiments, content services device(s) 748 may include a cable television box, personal computer, network, telephone, Internet enabled devices or appliance capable of delivering digital information and/or content, and any other similar device capable of unidirectionally or bidirectionally communicating content between content providers and platform 701 and/display 745, via network 753 or directly. It will be appreciated that the content may be communicated unidirectionally and/or bidirectionally to and from any one of the components in system 700 and a content provider via network 753. Examples of content may include any media information including, for example, video, music, medical and gaming information, and so forth.

Content services device(s) 748 receives content such as cable television programming including media information, digital information, and/or other content. Examples of content providers may include any cable or satellite television or radio or Internet content providers. The provided examples are not meant to limit embodiments of the invention.

In embodiments, platform 701 may receive control signals from navigation controller 750 having one or more navigation features. The navigation features of navigation controller 750 may be used to interact with a user interface 754, for example. In embodiments, navigation controller 750 may be a pointing device that may be a computer hardware component (specifically human interface device) that allows a user to input spatial (e.g., continuous and multi-dimensional) data into a computer. Many systems such as graphical user interfaces (GUI), and televisions and monitors allow the user to control and provide data to the computer or television using physical gestures.

Movements of the navigation features of navigation controller 750 may be echoed on a display (e.g., display 745) by movements of a pointer, cursor, focus ring, or other visual indicators displayed on the display. For example, under the control of software applications 751, the navigation features located on navigation controller 750 may be mapped to virtual navigation features displayed on user interface 754. In embodiments, navigation controller 750 may not be a separate component but integrated into platform 701 and/or display 745. Embodiments, however, are not limited to the elements or in the context shown or described herein.

In embodiments, drivers (not shown) may include technology to enable users to instantly turn on and off platform 701 like a television with the touch of a button after initial boot-up, when enabled, for example. Program logic may allow platform 701 to stream content to media adaptors or other content services device(s) 748 or content delivery device(s) 749 when the platform is turned "off." In addition, chip set 703 may include hardware and/or software support for 5.1 surround sound audio and/or high definition 7.1 surround sound audio, for example. Drivers may include a graphics driver for integrated graphics platforms. In embodiments, the graphics driver may include a peripheral component interconnect (PCI) Express graphics card.

In various embodiments, any one or more of the components shown in system 700 may be integrated. For example, platform 701 and content services device(s) 748 may be integrated, or platform 701 and content delivery device(s) 749 may be integrated, or platform 701, content services device(s) 748, and content delivery device(s) 749 may be integrated, for example. In various embodiments, platform 701 and display 745 may be an integrated unit. Display 745 and content service device(s) 748 may be integrated, or display 745 and content delivery device(s) 749 may be integrated, for example. These examples are not meant to limit the invention.

In various embodiments, system 700 may be implemented as a wireless system, a wired system, or a combination of both. When implemented as a wireless system, system 700 may include components and interfaces suitable for communicating over a wireless shared media, such as one or more antennas, transmitters, receivers, transceivers, amplifiers, filters, control logic, and so forth. An example of wireless shared media may include portions of a wireless spectrum, such as the RF spectrum and so forth. When implemented as a wired system, system 700 may include components and interfaces suitable for communicating over wired communications media, such as I/O adapters, physical connectors to connect the I/O adapter with a corresponding wired communications medium, a network interface card (NIC), disc controller, video controller, audio controller, and so forth. Examples of wired communications media may include a wire, cable, metal leads, printed circuit board (PCB), backplane, switch fabric, semiconductor material, twisted-pair wire, co-axial cable, fiber optics, and so forth.

Platform 701 may establish one or more logical or physical channels to communicate information. The information may include media information and control information. Media information may refer to any data representing content meant for a user. Examples of content may include, for example, data from a voice conversation, videoconference, streaming video, electronic mail ("email") message, voice mail message, alphanumeric symbols, graphics, image, video, text and so forth. Data from a voice conversation may be, for example, speech information, silence periods, background noise, comfort noise, tones and so forth. Control information may refer to any data representing commands, instructions or control words meant for an automated system. For example, control information may be used to route media information through a system, or instruct a node to process the media information in a predetermined manner. The embodiments, however, are not limited to the elements or in the context shown or described in FIG. 7.

Figure 8:
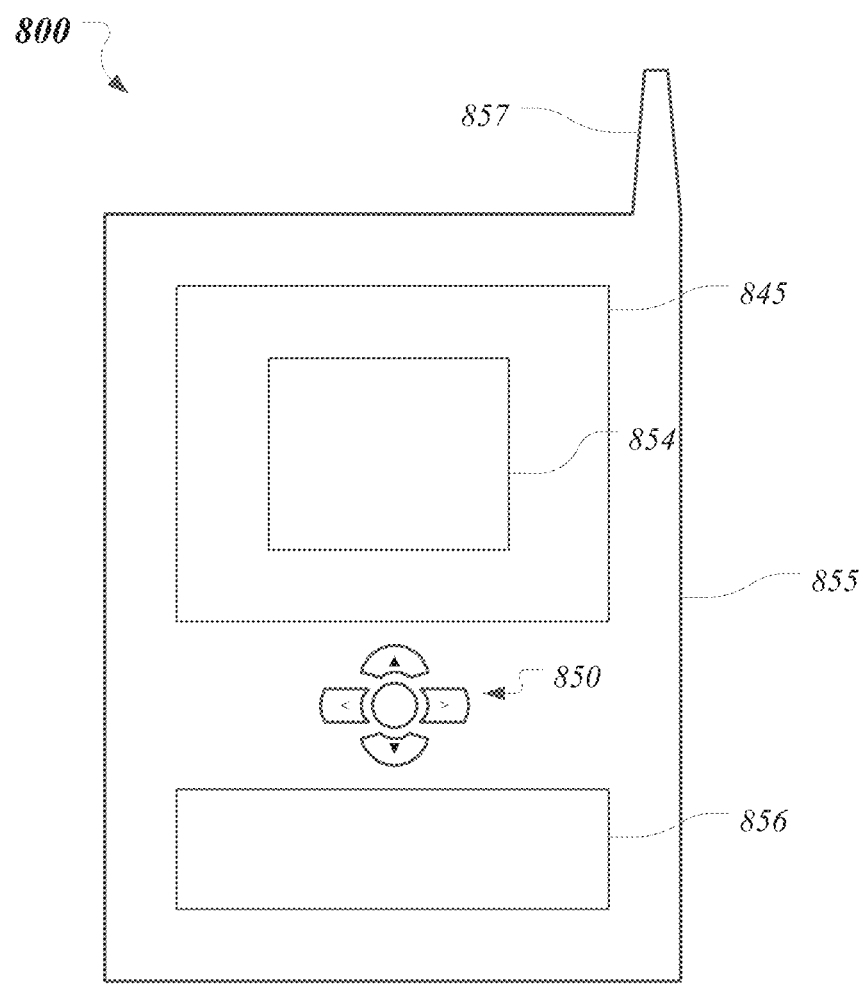
FIG. 8 illustrates one embodiment of a device.

As described above, system 700 may be embodied in varying physical styles or form factors. FIG. 8 illustrates embodiments of a small form factor device 800 in which system 700 may be embodied. In embodiments, for example, device 800 may be implemented as a mobile computing device having wireless capabilities. A mobile computing device may refer to any device having a processing system and a mobile power source or supply, such as one or more batteries, for example.

As described above, examples of a mobile computing device may include a personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth.

Examples of a mobile computing device also may include computers that are arranged to be worn by a person, such as a wrist computer, finger computer, ring computer, eyeglass computer, belt-clip computer, arm-band computer, shoe computers, clothing computers, and other wearable computers. In embodiments, for example, a mobile computing device may be implemented as a smart phone capable of executing computer applications, as well as voice communications and/or data communications. Although some embodiments may be described with a mobile computing device implemented as a smart phone by way of example, it may be appreciated that other embodiments may be implemented using other wireless mobile computing devices as well. The embodiments are not limited in this context.

As shown in FIG. 8, device 800 may include a display 845, a navigation controller 850, a user interface 854, a housing 855, an I/O device 856, and an antenna 857. Display 845 may include any suitable display unit for displaying information appropriate for a mobile computing device, and may be the same as or similar to display 745 in FIG. 7. Navigation controller 850 may include one or more navigation features which may be used to interact with user interface 854, and may be the same as or similar to navigation controller 750 in FIG. 7. I/O device 856 may include any suitable I/O device for entering information into a mobile computing device. Examples for I/O device 856 may include an alphanumeric keyboard, a numeric keypad, a touch pad, input keys, buttons, switches, rocker switches, microphones, speakers, voice recognition device and software, and so forth. Information also may be entered into device 800 by way of microphone. Such information may be digitized by a voice recognition device. The embodiments are not limited in this context.

Various embodiments may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one embodiment may be implemented by representative instructions stored on a machine-readable medium which represents various logic within a processor element, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor element. Some embodiments may be implemented, for example, using a machine-readable medium or article which may store an instruction or a set of instructions that, if executed by a machine, may cause the machine to perform a method and/or operations in accordance with the embodiments. Such a machine may include, for example, any suitable processing platform, computing platform, computing device, processing device, computing system, processing system, computer, processor element, or the like, and may be implemented using any suitable combination of hardware and/or software. The machine-readable medium or article may include, for example, any suitable type of memory unit, memory device, memory article, memory medium, storage device, storage article, storage medium and/or storage unit, for example, memory, removable or non-removable media, erasable or non-erasable media, writeable or re-writeable media, digital or analog media, hard disk, floppy disk, Compact Disk Read Only Memory (CD-ROM), Compact Disk Recordable (CD-R), Compact Disk Rewriteable (CD-RW), optical disk, magnetic media, magneto-optical media, removable memory cards or disks, various types of Digital Versatile Disk (DVD), a tape, a cassette, or the like. The instructions may include any suitable type of code, such as source code, compiled code, interpreted code, executable code, static code, dynamic code, encrypted code, and the like, implemented using any suitable high-level, low-level, object-oriented, visual, compiled and/or interpreted programming language.

The following examples pertain to further embodiments.

Example 1 is a media sharing apparatus, comprising: a processor element; a classification module for execution by the processor element to assign a media item to a content category; a correlation module for execution by the processor element to determine context information for the media item; and an estimation module for execution by the processor element to determine a set of relevance values for a set of contacts based at least in part on a sharing history and to generate a set of suggested recipients for the media item based at least in part on the set of relevance values and the set of contacts.

In Example 2, the classification module of Example 1 may optionally be for execution by the processor element to perform one or more feature recognition techniques to identify one or more features in the media item and to assign the media item to the content category based at least in part on the one or more features.

In Example 3, the correlation module of Example 2 may optionally be for execution by the processor element to determine the context information based at least in part on the one or more features In Example 4, the classification module of any one of Examples 1 to 3 may optionally be for execution by the processor element to assign the media item to the content category based at least in part on the context information.

In Example 5, the estimation module of any one of Examples 1 to 4 may optionally be for execution by the processor element to determine the set of relevance values based at least in part on the context information.

In Example 6, the estimation module of any one of Examples 1 to 5 may optionally be for execution by the processor element to determine a set of communications history parameters based at least in part on the sharing history, and determine a relevance value as a weighted sum of the set of communications history parameters.

In Example 7, the estimation module of any one of Examples 1 to 6 may optionally be for execution by the processor element to determine one or more relevance values based at least in part on a frequency of past communication with one or more contacts.

In Example 8, the estimation module of any one of Examples 1 to 7 may optionally be for execution by the processor element to determine one or more relevance values based at least in part on a duration of one or more past communications with one or more contacts.

In Example 9, the estimation module of any one of Examples 1 to 8 may optionally be for execution by the processor element to determine at least one suggested recipient comprising a group of contacts.

In Example 10, the estimation module of any one of Examples 1 to 9 may optionally be for execution by the processor element to determine at least one path-specific suggested recipient.

In Example 11, the path-specific suggested recipient of Example 10 may optionally correspond to communication with a contact by text message.

In Example 12, the path-specific suggested recipient of Example 10 may optionally correspond to communication with a contact by social networking message.

In Example 13, the classification module of any one of Examples 1 to 12 may optionally be for execution by the processor element to determine one or more contacts that appear in the media item.

In Example 14, the media item of any one of Examples 1 to 13 may optionally comprise a digital photograph.

In Example 15, the media item of any one of Examples 1 to 13 may optionally comprise a video.

Example 16 is at least one machine-readable medium comprising a set of instructions that, in response to being executed on a computing device, cause the computing device to: assign a media item to a content category; determine context information for the media item; determine a set of relevance values for a set of contacts based at least in part on a sharing history; and generate a set of suggested recipients for the media item based at least in part on the set of relevance values and the set of contacts.

In Example 17, the at least one machine-readable medium of Example 16 may optionally comprise instructions that, in response to being executed on the computing device, cause the computing device to: perform one or more feature recognition techniques to identify one or more features in the media item; and assign the media item to the content category based at least in part on the one or more features.

In Example 18, the at least one machine-readable medium of Example 17 may optionally comprise instructions that, in response to being executed on the computing device, cause the computing device to determine the context information based at least in part on the one or more features.

In Example 19, the at least one machine-readable medium of any one of Examples 16 to 18 may optionally comprise instructions that, in response to being executed on the computing device, cause the computing device to assign the media item to the content category based at least in part on the context information.

In Example 20, the at least one machine-readable medium of any one of Examples 16 to 19 may optionally comprise instructions that, in response to being executed on the computing device, cause the computing device to determine the set of relevance values based at least in part on the context information.

In Example 21, the at least one machine-readable medium of any one of Examples 16 to 20 may optionally comprise instructions that, in response to being executed on the computing device, cause the computing device to: determine a set of communications history parameters based at least in part on the sharing history; and determine a relevance value as a weighted sum of the set of communications history parameters.

In Example 22, the at least one machine-readable medium of any one of Examples 16 to 21 may optionally comprise instructions that, in response to being executed on the computing device, cause the computing device to determine one or more relevance values based at least in part on a frequency of past communication with one or more contacts.

In Example 23, the at least one machine-readable medium of any one of Examples 16 to 22 may optionally comprise instructions that, in response to being executed on the computing device, cause the computing device to determine one or more relevance values based at least in part on a duration of one or more past communications with one or more contacts.

In Example 24, the at least one machine-readable medium of any one of Examples 16 to 23 may optionally comprise instructions that, in response to being executed on the computing device, cause the computing device to determine at least one suggested recipient comprising a group of contacts.

In Example 25, the at least one machine-readable medium of any one of Examples 16 to 24 may optionally comprise instructions that, in response to being executed on the computing device, cause the computing device to determine at least one path-specific suggested recipient.

In Example 26, the path-specific suggested recipient of Example 25 may optionally correspond to communication with a contact by text message.

In Example 27, the path-specific suggested recipient of Example 25 may optionally correspond to communication with a contact by social networking message.

In Example 28, the at least one machine-readable medium of any one of Examples 16 to 27 may optionally comprise instructions that, in response to being executed on the computing device, cause the computing device to determine one or more contacts that appear in the media item.

In Example 29, the media item of any one of Examples 16 to 28 may optionally comprise a digital photograph.

In Example 30, the media item of any one of Examples 16 to 28 may optionally comprise a video.

Example 31 is a media sharing method, comprising: assigning a media item to a content category; determining context information for the media item; determining a set of relevance values for a set of contacts based at least in part on a sharing history; and generating a set of suggested recipients for the media item based at least in part on the set of relevance values and the set of contacts.

In Example 32, the media sharing method of Example 31 may optionally comprise: performing one or more feature recognition techniques to identify one or more features in the media item; and assigning the media item to the content category based at least in part on the one or more features.

In Example 33, the media sharing method of Example 32 may optionally comprise determining the context information based at least in part on the one or more features.

In Example 34, the media sharing method of any one of Examples 31 to 33 may optionally comprise assigning the media item to the content category based at least in part on the context information.

In Example 35, the media sharing method of any one of Examples 31 to 34 may optionally comprise determining the set of relevance values based at least in part on the context information.

In Example 36, the media sharing method of any one of Examples 31 to 35 may optionally comprise: determining a set of communications history parameters based at least in part on the sharing history; and determining a relevance value as a weighted sum of the set of communications history parameters.

In Example 37, the media sharing method of any one of Examples 31 to 36 may optionally comprise determining one or more relevance values based at least in part on a frequency of past communication with one or more contacts.

In Example 38, the media sharing method of any one of Examples 31 to 37 may optionally comprise determining one or more relevance values based at least in part on a duration of one or more past communications with one or more contacts.

In Example 39, the media sharing method of any one of Examples 31 to 38 may optionally comprise determining at least one suggested recipient comprising a group of contacts.

In Example 40, the media sharing method of any one of Examples 31 to 39 may optionally comprise determining at least one path-specific suggested recipient.

In Example 41, the path-specific suggested recipient of Example 40 may optionally correspond to communication with a contact by text message.

In Example 42, the path-specific suggested recipient of Example 40 may optionally correspond to communication with a contact by social networking message.

In Example 43, the media sharing method of any one of Examples 31 to 42 may optionally comprise determining one or more contacts that appear in the media item.

In Example 44, the media item of any one of Examples 31 to 43 may optionally comprise a digital photograph.

In Example 45, the media item of any one of Examples 31 to 43 may optionally comprise a video.

In Example 46, at least one machine-readable medium may comprise a plurality of instructions that, in response to being executed on a computing device, cause the computing device to perform a media sharing method according to any one of Examples 31 to 45.

In Example 47, an apparatus may comprise means for performing a media sharing method according to any one of Examples 31 to 45.

In Example 48, a communications device may be arranged to perform a media sharing method according to any one of Examples 31 to 45.

In Example 49, a media sharing system comprises: a processor element; a classification module for execution by the processor element to assign a media item to a content category; a correlation module for execution by the processor element to determine context information for the media item; an estimation module for execution by the processor element to determine a set of relevance values for a set of contacts based at least in part on a sharing history and to generate a set of suggested recipients for the media item based at least in part on the set of relevance values and the set of contacts; a radio frequency (RF) transceiver; and a sharing module coupled to the RF transceiver, the sharing module to cause transmission of one or more sharing messages comprising the media item via the transceiver.

In Example 50, the classification module of Example 49 may optionally be for execution by the processor element to perform one or more feature recognition techniques to identify one or more features in the media item and to assign the media item to the content category based at least in part on the one or more features.

In Example 51, the correlation module of Example 50 may optionally be for execution by the processor element to determine the context information based at least in part on the one or more features In Example 52, the classification module of any one of Examples 49 to 51 may optionally be for execution by the processor element to assign the media item to the content category based at least in part on the context information.

In Example 53, the estimation module of any one of Examples 49 to 52 may optionally be for execution by the processor element to determine the set of relevance values based at least in part on the context information.

In Example 54, the estimation module of any one of Examples 49 to 53 may optionally be for execution by the processor element to determine a set of communications history parameters based at least in part on the sharing history, and determine a relevance value as a weighted sum of the set of communications history parameters.

In Example 55, the estimation module of any one of Examples 49 to 54 may optionally be for execution by the processor element to determine one or more relevance values based at least in part on a frequency of past communication with one or more contacts.

In Example 56, the estimation module of any one of Examples 49 to 55 may optionally be for execution by the processor element to determine one or more relevance values based at least in part on a duration of one or more past communications with one or more contacts.

In Example 57, the estimation module of any one of Examples 49 to 56 may optionally be for execution by the processor element to determine at least one suggested recipient comprising a group of contacts.

In Example 58, the estimation module of any one of Examples 49 to 57 may optionally be for execution by the processor element to determine at least one path-specific suggested recipient.

In Example 59, the path-specific suggested recipient of Example 58 may optionally correspond to communication with a contact by text message.

In Example 60, the path-specific suggested recipient of Example 58 may optionally correspond to communication with a contact by social networking message.

In Example 61, the classification module of any one of Examples 49 to 60 may optionally be for execution by the processor element to determine one or more contacts that appear in the media item.

In Example 62, the media item of any one of Examples 49 to 61 may optionally comprise a digital photograph.

In Example 63, the media item of any one of Examples 49 to 61 may optionally comprise a video.

In Example 64, the media sharing system of any one of Examples 49 to 63 may optionally comprise a touch screen display, a keyboard, a memory port, and multiple antennas.

Example 65 is a media sharing apparatus, comprising: means for assigning a media item to a content category; means for determining context information for the media item; means for determining a set of relevance values for a set of contacts based at least in part on a sharing history; and means for generating a set of suggested recipients for the media item based at least in part on the set of relevance values and the set of contacts.

In Example 66, the media sharing apparatus of Example 65 may optionally comprise: means for performing one or more feature recognition techniques to identify one or more features in the media item; and means for assigning the media item to the content category based at least in part on the one or more features.

In Example 67, the media sharing apparatus of Example 66 may optionally comprise means for determining the context information based at least in part on the one or more features.

In Example 68, the media sharing apparatus of any one of Examples 65 to 67 may optionally comprise means for assigning the media item to the content category based at least in part on the context information.

In Example 69, the media sharing apparatus of any one of Examples 65 to 68 may optionally comprise means for determining the set of relevance values based at least in part on the context information.

In Example 70, the media sharing apparatus of any one of Examples 65 to 69 may optionally comprise: means for determining a set of communications history parameters based at least in part on the sharing history; and means for determining a relevance value as a weighted sum of the set of communications history parameters.

In Example 71, the media sharing apparatus of any one of Examples 65 to 70 may optionally comprise means for determining one or more relevance values based at least in part on a frequency of past communication with one or more contacts.

In Example 72, the media sharing apparatus of any one of Examples 65 to 71 may optionally comprise means for determining one or more relevance values based at least in part on a duration of one or more past communications with one or more contacts.

In Example 73, the media sharing apparatus of any one of Examples 65 to 72 may optionally comprise means for determining at least one suggested recipient comprising a group of contacts.

In Example 74, the media sharing apparatus of any one of Examples 65 to 73 may optionally comprise means for determining at least one path-specific suggested recipient.

In Example 75, the path-specific suggested recipient of Example 74 may optionally correspond to communication with a contact by text message.

In Example 76, the path-specific suggested recipient of Example 74 may optionally correspond to communication with a contact by social networking message.

In Example 77, the media sharing apparatus of any one of Examples 75 to 76 may optionally comprise means for determining one or more contacts that appear in the media item.

In Example 78, the media item of any one of Examples 65 to 77 may optionally comprise a digital photograph.

In Example 79, the media item of any one of Examples 65 to 77 may optionally comprise a video.

Numerous specific details have been set forth herein to provide a thorough understanding of the embodiments. It will be understood by those skilled in the art, however, that the embodiments may be practiced without these specific details. In other instances, well-known operations, components, and circuits have not been described in detail so as not to obscure the embodiments. It can be appreciated that the specific structural and functional details disclosed herein may be representative and do not necessarily limit the scope of the embodiments.

Some embodiments may be described using the expression "coupled" and "connected" along with their derivatives. These terms are not intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

Unless specifically stated otherwise, it may be appreciated that terms such as "processing," "computing," "calculating," "determining," or the like, refer to the action and/or processes of a computer or computing system, or similar electronic computing device, that manipulates and/or transforms data represented as physical quantities (e.g., electronic) within the computing system's registers and/or memories into other data similarly represented as physical quantities within the computing system's memories, registers or other such information storage, transmission or display devices. The embodiments are not limited in this context.

It should be noted that the methods described herein do not have to be executed in the order described, or in any particular order. Moreover, various activities described with respect to the methods identified herein can be executed in serial or parallel fashion.

Although specific embodiments have been illustrated and described herein, it should be appreciated that any arrangement calculated to achieve the same purpose may be substituted for the specific embodiments shown. This disclosure is intended to cover any and all adaptations or variations of various embodiments. It is to be understood that the above description has been made in an illustrative fashion, and not a restrictive one.

Combinations of the above embodiments, and other embodiments not specifically described herein will be apparent to those of skill in the art upon reviewing the above description. Thus, the scope of various embodiments includes any other applications in which the above compositions, structures, and methods are used.

It is emphasized that the Abstract of the Disclosure is provided to comply with 37 C.F.R. § 1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate preferred embodiment. In the appended claims, the terms "including" and "in which" are used as the plain-English equivalents of the respective terms "comprising" and "wherein," respectively. Moreover, the terms "first," "second," and "third," etc. are used merely as labels, and are not intended to impose numerical requirements on their objects.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

The invention claimed is:

1. An apparatus, comprising:
a processor element; and
a memory coupled to the processor element, the memory comprising:
   a classification module executable by the processor element, the classification module to assign a media item to a content category;
   a correlation module executable by the processor element, the correlation module to determine context information for the media item;
   an aggregation module executable by the processor element, the aggregation module to:
      determine at least one contact comprising an entity and a plurality of manners of communication with the entity, and
      generate a plurality of path-specific contacts for the at least one contact, the plurality of path-specific contacts comprising a single path-specific contact for each of the plurality of manners of communication with the entity, the single path specific contact comprising the entity and a single manner of communication of the plurality of manners of communication with the entity; and
   an estimation module executable by the processor element, the estimation module to:
      determine a set of relevance values comprising a single relevance value for each single path-specific contact based at least in part on a sharing history, the sharing history to indicate at least one previously performed sharing operation, each of the set of relevance values indicating a level of relevance of the media item to the single path specific contact, and
      generate at least one suggested recipient for the media item, the at least one suggested recipient indicating the single path-specific contact having a highest relevance value.

2. The apparatus of claim 1, comprising the classification module to perform one or more feature recognition techniques to identify one or more features in the media item and to assign the media item to the content category based at least in part on the one or more features.

3. The apparatus of claim 2, comprising the correlation module to determine the context information based at least in part on the one or more features.

4. The apparatus of claim 1, comprising the estimation module to determine the set of relevance values based at least in part on the context information.

5. The apparatus of claim 1, comprising the estimation module to determine a set of communications history parameters based at least in part on the sharing history, and determine a relevance value as a weighted sum of the set of communications history parameters.

6. The apparatus of claim 1, comprising the estimation module to determine one or more relevance values based at least in part on a duration of one or more past communications with one or more contacts.

7. The apparatus of claim 1, the estimation module to determine the set of relevance values based on at least one communications history characteristic of at least one of the plurality of path-specific contacts responsive to the at least one of the plurality of path-specific contacts not being associated with the sharing history.

8. The apparatus of claim 7, the estimation module to determine the set of relevance values based on a social closeness of the set of path-specific contacts based on at least one communications history characteristic.

9. The apparatus of claim 7, the communications history characteristics comprising at least one of a frequency of communications with at least one of the set of path-specific contacts, a duration of communications with the at least one of the set of path-specific contacts, and an amount of time that has elapsed since a most recent communication with the at least one of the set of path-specific contacts.

10. The apparatus of claim 1, the estimation module to:
parse past communication information for each of the plurality of path-specific contacts into a plurality of discrete segments of past time, and
determine average normalized values for one of communication frequency or communication duration for each of the plurality of discrete segments of time.

11. The apparatus of claim 1, the estimation module to:
parse past communication information for each of the plurality of path-specific contacts into a plurality of discrete segments of past time, and
assign weights to each of the plurality of discrete segments of time by:

assigning greater weights to more recent discrete segments of time, and
assigning lesser weights to less recent discrete segments of time.

12. The apparatus of claim 1, the aggregation module to obtain event information from one of a calendar application or past communications, and
the correlation module to:
receive the event information, and
generate context information for the media item based on the event information.

13. The apparatus of claim 1, the memory comprising a sharing module executable by the processor element, the sharing module to:
generate a communication to share the media item with the at least one suggested recipient, and
populate at least one portion of the communication with the context information.

14. At least one non-transitory machine-readable medium comprising a set of instructions that, in response to being executed on a computing device, cause the computing device to:
assign a media item to a content category;
determine context information for the media item;
determine at least one contact comprising an entity and a plurality of manners of communication with the entity;
generate a plurality of path-specific contacts for the at least one contact, the plurality of path-specific contacts comprising a single path-specific contact for each of the plurality of manners of communication with the entity, the single path specific contact comprising the entity and a single manner of communication of the plurality of manners of communication with the entity; and
determine a set of relevance values comprising a single relevance value for each single path-specific contact based at least in part on a sharing history, the sharing history to indicate at least one previously performed sharing operation, each of the set of relevance values indicating a level of relevance of the media item to the single path specific contact, and
generate at least one suggested recipient for the media item, the at least one suggested recipient indicating the single path-specific contact having a highest relevance value.

15. The at least one non-transitory machine-readable medium of claim 14, comprising instructions that, in response to being executed on the computing device, cause the computing device to:
perform one or more feature recognition techniques to identify one or more features in the media item; and
assign the media item to the content category based at least in part on the one or more features.

16. The at least one non-transitory machine-readable medium of claim 15, comprising instructions that, in response to being executed on the computing device, cause the computing device to determine the context information based at least in part on the one or more features.

17. The at least one non-transitory machine-readable medium of claim 14, comprising instructions that, in response to being executed on the computing device, cause the computing device to determine the set of relevance values based at least in part on the context information.

18. The at least one non-transitory machine-readable medium of claim 14, comprising instructions that, in response to being executed on the computing device, cause the computing device to:
determine a set of communications history parameters based at least in part on the sharing history; and
determine a relevance value as a weighted sum of the set of communications history parameters.

19. The at least one non-transitory machine-readable medium of claim 14, comprising instructions that, in response to being executed on the computing device, cause the computing device to determine one or more relevance values based at least in part on a duration of one or more past communications with one or more contacts.

20. The at least one non-transitory machine-readable medium of claim 14, comprising instructions that, in response to being executed on the computing device, cause the computing device to:
parse past communication information for each of the plurality of path-specific contacts into a plurality of discrete segments of past time; and
assign weights to each of the plurality of discrete segments of time by:
assigning greater weights to more recent discrete segments of time, and
assigning lesser weights to less recent discrete segments of time.

21. The at least one non-transitory machine-readable medium of claim 14, comprising instructions that, in response to being executed on the computing device, cause the computing device to:
obtain event information from one of a calendar application or past communications; and
generate context information for the media item based on the event information.

22. A computer-implemented method, comprising, by at least one processor element:
performing one or more feature recognition techniques to identify one or more features in a media item;
assigning the media item to a content category based at least in part on the one or more features;
determining context information for the media item;
determining at least one contact comprising an entity and a plurality of manners of communication with the entity;
generating a plurality of path-specific contacts for the at least one contact, the plurality of path-specific contacts comprising a single path-specific contact for each of the plurality of manners of communication with the entity, the single path specific contact comprising the entity and a single manner of communication of the plurality of manners of communication with the entity; and
determining a set of relevance values comprising a single relevance value for each single path-specific contact based at least in part on a sharing history, the sharing history to indicate at least one previously performed sharing operation, each of the set of relevance values indicating a level of relevance of the media item to the single path specific contact, and
generating at least one suggested recipient for the media item, the at least one suggested recipient indicating the single path-specific contact having a highest relevance value.

23. The computer-implemented method of claim 22, comprising:
determining a set of communications history parameters based at least in part on the sharing history; and
determining a relevance value as a weighted sum of the set of communications history parameters.

24. The computer-implemented method of claim 22, comprising:

parsing past communication information for each of the plurality of path-specific contacts into a plurality of discrete segments of past time; and assigning weights to each of the plurality of discrete segments of time by:
  assigning greater weights to more recent discrete segments of time, and
  assigning lesser weights to less recent discrete segments of time.

25. The computer-implemented method of claim 22, comprising:
  obtaining event information from a calendar application; and
  generating context information for the media item based on the event information.

* * * * *